United States Patent
Koegel et al.

(10) Patent No.: US 12,424,861 B2
(45) Date of Patent: Sep. 23, 2025

(54) CHARGING APPARATUS FOR A RECHARGEABLE BATTERY PACK

(71) Applicant: Robert Bosch GmbH, Stuttgart (DE)

(72) Inventors: Jan Koegel, Zusmarshausen (DE); Marc-Alexandre Seibert, Stuttgart (DE); Maria Poess, Sindelfingen (DE); Martin Gonda, Buehl (DE); Oliver Klee, Aidlingen (DE); Thorsten Seidel, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 712 days.

(21) Appl. No.: 17/688,240

(22) Filed: Mar. 7, 2022

(65) Prior Publication Data

US 2022/0320882 A1   Oct. 6, 2022

(30) Foreign Application Priority Data

Mar. 30, 2021  (DE) ...................... 10 2021 203 224.9

(51) Int. Cl.
*H02J 7/00*    (2006.01)
*H01M 50/204*  (2021.01)

(52) U.S. Cl.
CPC ......... *H02J 7/0045* (2013.01); *H01M 50/204* (2021.01); *H02J 7/0013* (2013.01); *H02J 7/0044* (2013.01)

(58) Field of Classification Search
CPC .................................................... H02J 7/0045
See application file for complete search history.

(56) References Cited

U.S. PATENT DOCUMENTS

| | | | | |
|---|---|---|---|---|
| 5,909,101 A | * | 6/1999 | Matsumoto | H02J 7/007192 320/110 |
| 6,018,227 A | * | 1/2000 | Kumar | H02J 7/00036 320/112 |
| 6,597,152 B1 | * | 7/2003 | Jacobs | H02J 7/0045 320/113 |
| 7,835,534 B2 | * | 11/2010 | Cole, Jr. | A45C 15/00 381/189 |
| 8,733,470 B2 | * | 5/2014 | Matthias | B25F 5/02 173/171 |
| 9,077,053 B2 | * | 7/2015 | Schneider | H02J 7/0013 |
| 10,230,078 B2 | * | 3/2019 | Kubota | H01M 50/249 |
| 11,148,272 B2 | * | 10/2021 | Yoshikane | B25D 16/00 |

(Continued)

FOREIGN PATENT DOCUMENTS

DE  10 2016 205 773 A1  10/2017

*Primary Examiner* — Tynese V McDaniel
(74) *Attorney, Agent, or Firm* — Maginot, Moore & Beck LLP (57) ABSTRACT

The disclosure relates to a charging apparatus for a rechargeable battery pack, having a housing, having at least one first rechargeable battery interface that is designed so as to releasably connect the charging apparatus to a first rechargeable battery pack along a first connection direction, having a second rechargeable battery interface that is designed so as to releasably connect the charging apparatus to a second rechargeable battery pack along a second connection direction, wherein the connection directions intersect the rechargeable battery pack in the state connected to the charging apparatus. It is proposed that the first connection direction and the second connection direction are arranged crossing each other.

13 Claims, 5 Drawing Sheets

(56) References Cited

U.S. PATENT DOCUMENTS

| | | | | |
|---|---|---|---|---|
| 11,601,002 B2 * | 3/2023 | Gao | ............... | H02J 7/0063 |
| 2005/0225298 A1 * | 10/2005 | Tashiro | ............... | H02J 7/00304 |
| | | | | 320/134 |
| 2007/0216350 A1 * | 9/2007 | Sakaue | ............... | H01M 10/46 |
| | | | | 320/112 |
| 2008/0174269 A1 * | 7/2008 | DeRome | ............... | H02J 7/0049 |
| | | | | 320/112 |
| 2015/0084596 A1 * | 3/2015 | Pickens | ............... | A45C 13/02 |
| | | | | 320/127 |
| 2015/0123614 A1 * | 5/2015 | Cover | ............... | H02J 7/00047 |
| | | | | 320/110 |
| 2015/0180246 A1 * | 6/2015 | Roth | ............... | H02J 7/0044 |
| | | | | 320/115 |
| 2016/0322842 A1 * | 11/2016 | Sorhage | ............... | B25F 5/00 |
| 2017/0093188 A1 * | 3/2017 | Suzuki | ............... | H01M 50/213 |
| 2018/0278071 A1 * | 9/2018 | Murakami | ............... | H02J 7/0013 |
| 2020/0185941 A1 * | 6/2020 | Lee | ............... | H02J 7/00047 |
| 2021/0184410 A1 * | 6/2021 | Huang | ............... | H01R 13/6275 |
| 2022/0069603 A1 * | 3/2022 | Williams | ............... | H02J 7/0045 |
| 2023/0204203 A1 * | 6/2023 | Muelling | ............... | H02J 7/0045 |
| | | | | 362/154 |
| 2024/0022096 A1 * | 1/2024 | Hegemann | ............... | H02J 50/10 |

* cited by examiner

CHARGING APPARATUS FOR A RECHARGEABLE BATTERY PACK

This application claims priority under 35 U.S.C. § 119 to application no. DE 10 2021 203 224.9, filed on Mar. 30, 2021 in Germany, the disclosure of which is incorporated herein by reference in its entirety.

BACKGROUND

DE 10 2016 205 773 A1 describes a charging apparatus for charging two rechargeable battery packs.

SUMMARY

The disclosure relates to a charging apparatus for a rechargeable battery pack, having a housing, having at least one first rechargeable battery interface that is designed so as to releasably connect the charging apparatus to a first rechargeable battery pack along a first connection direction, having a second rechargeable battery interface that is designed so as to releasably connect the charging apparatus to a second rechargeable battery pack along a second connection direction, wherein the connection directions intersect the rechargeable battery pack in the state connected to the charging apparatus. It is proposed that the first connection direction and the second connection direction are arranged crossing each other. Advantageously, this renders it possible to provide a particularly compact charging apparatus.

The rechargeable battery pack is in particular part of a system that is composed of the rechargeable battery pack and a consumer, wherein the consumer can be supplied with energy via the rechargeable battery pack during operation. The rechargeable battery pack is in particular designed as a hand tool rechargeable battery pack. The rechargeable battery pack is in particular designed as a replaceable rechargeable battery pack. The rechargeable battery pack is designed such that it can be connected in particular to the charging apparatus for charging the rechargeable battery pack. The rechargeable battery pack has a housing in which at least one rechargeable battery cell is arranged, wherein the housing is designed as an outer housing. The rechargeable battery pack, in particular the housing of the rechargeable battery pack, is designed such that it can in particular be releasably connected to the consumer and/or the charging apparatus via a mechanical interface. The housing of the rechargeable battery pack can have one or multiple housing parts.

The consumer can be designed as a garden tool, such as a lawnmower or hedge trimmer, a household appliance, such as for example a power window cleaner or handheld vacuum cleaner, a handheld power tool, such as for example an angle grinder, a screwdriver, a drill, a hammer drill, etc., as an electric means of transportation, such as for example a pedelec or an e-bike, or as a measuring tool, such as for example a laser distance measuring device. Furthermore, it is also conceivable that the consumer is designed as another in particular portable device, such as for example construction site lighting, a suction device or a construction site radio.

The charging apparatus is designed so as to charge or supply the rechargeable battery pack with energy in the connected state. The charging apparatus has an energy source interface via which the charging apparatus can be connected to an energy source. The energy source is preferably designed as an electricity network. The electricity network is designed in particular as an AC current source, wherein the hand tool machine or the consumer are designed as a DC current consumer. The charging apparatus has an electronic system. The electronic system has multiple electronic components. It is preferred that the electronic system has a control unit for controlling or regulating the charging procedure. The control unit can comprise by way of example a computing unit, in particular a CPU. It is preferred that the control unit is designed in such a manner that different rechargeable battery packs can be charging using one or different charging methods. In addition, the charging device has in particular an AC-DC converter unit. The AC-DC converter unit is designed so as to convert an AC voltage signal into a DC voltage signal. The AC-DC converter unit is preferably part of the electronic system of the charging apparatus. The AC-DC converter unit has a rectifier that is designed so as to convert an AC voltage input into a DC voltage output.

The housing of the charging apparatus can be produced from a metal material and/or a synthetic material. The housing is designed as an outer housing. It is preferred that the housing can be connected to the electricity network via a power cable. The housing can have one or multiple standing surfaces against which the housing can be positioned during operation. The standing surfaces are preferably planar.

The rechargeable battery interface of the charging apparatus is designed so as to mechanically and electrically connect the charging apparatus to the rechargeable battery pack. The charging apparatus can have one or multiple, such as for example, two or six, first and second rechargeable battery interfaces. The rechargeable battery interfaces can be arranged by way of example adjacent to one another, one behind the other, symmetrically distributed etc.

The rechargeable battery interfaces have in each case a mechanical interface so as to provide a mechanical connection and an electrical interface so as to provide an electrical connection. The mechanical rechargeable battery interface is preferably designed as one piece or as one part with the charger housing. The mechanical rechargeable battery interface can be arranged on an outer surface of the charger housing. It is likewise conceivable that the mechanical rechargeable battery interface is arranged in a, preferably closable, rechargeable battery receiving chamber of the charger housing. The mechanical interface comprises at least one connecting element that is designed in particular so as to provide a non-positive locking and/or positive-locking connection. The connecting element can be designed by way of example as a guiding rail, as a guiding groove, as a latching arm etc.

In addition, the rechargeable battery interface has an electrical interface so as to electrically connect the energy supply apparatus, in particular the electronic system of the charging apparatus, to the rechargeable battery pack. The electrical interface can be designed as a contact interface that has at least two electrical contact elements. The electrical contact elements can be designed as power contacts for transmitting current and/or as signal contacts for transmitting information. It is likewise conceivable that the electrical interface is designed for the inductive transmission of energy.

The connection directions are determined essentially by guiding means of the first and second rechargeable battery interface of the charging apparatus and corresponding guiding means of the respective rechargeable battery pack. The connection direction can be implemented in a translatory or rotatory manner or a combination of these. The connection direction in the connected state is in this case the connection direction along which the rechargeable battery pack is moved at the end of the connecting movement.

The term 'crossing' is to be understood to mean initially only not parallel and not coaxial. It is preferred that the connection directions cross in such a manner that the connection directions cross in an angle range of 60° to 90°, in particular of 70° to 85°. Alternatively, it is also conceivable that the connection directions cross in a range of 1° to 45°, in particular of 10° to 40°, preferably of 15° to 30°.

Furthermore, it is proposed that the first and the second rechargeable battery interface cannot be simultaneously connected to a rechargeable battery pack. This is as a result of the fact that the different rechargeable battery packs in the state connected to the rechargeable battery interfaces occupy in part or entirely the same space.

Furthermore, it is proposed that the first rechargeable battery interface has a first electrical interface and the second rechargeable battery interface has a second electrical interface that are designed separately from one another. The spacing between the first electrical interface and the second electrical interface is in particular smaller that a maximum length of the first and/or the second connection direction in the intersection, preferably smaller than 75% of the length of the first and/or second connection direction in the intersection, preferably smaller than 50% of the length of the first and/or second connection direction in the intersection. Advantageously, as a result the compactness is further increased.

In addition, it is proposed that the first rechargeable battery interface has a slide surface that extends along or parallel to the first connection direction, wherein the slide surface of the first rechargeable battery interface has a rechargeable battery receiving orifice that is allocated to the second rechargeable battery interface. The receiving orifice of the second rechargeable battery interface is designed so as to receive the second rechargeable battery pack. The first and the second rechargeable battery pack can be received in the space upstream of the receiving orifice, whereas only the second rechargeable battery pack can be received in the space downstream of the receiving office.

Furthermore, it is proposed that a width of the first rechargeable battery interface is greater than a width of the second rechargeable battery interface. The width of the rechargeable battery interface is in particular a maximum width of the space in a perpendicular manner with respect to the connection direction that is provided so as to receive the rechargeable battery pack. Alternatively, it is also conceivable that the widths are designed as a maximum spacing of two guiding means of the first and of the second rechargeable battery interface. The first rechargeable battery interface is in particular at least 10%, preferably at least 25%, preferably at least 50%, wider than the second rechargeable battery interface. It is likewise conceivable that the first rechargeable battery interface is more than twice as wide as the second rechargeable battery interface. Alternatively, it is also conceivable that the second rechargeable battery interface is designed larger than the first rechargeable battery interface.

Furthermore, it is proposed that the charging apparatus has at least two first rechargeable battery interfaces and at least two second rechargeable battery interfaces. Advantageously, two identical or two different rechargeable battery packs can be charged simultaneously as a result.

In addition, it is proposed that the charging apparatus has a charger interface that is designed so as to electrically and mechanically connect the charging apparatus to a further charging apparatus. The charging apparatus can have the charger interface alternatively or in addition to the energy source interface. Advantageously, multiple charging apparatuses can be connected to one another as a result. The charger interface and the energy source interface can be arranged on the same side of the charging apparatus or on different sides. In particular, the charger interface is arranged adjacent to the standing surface of the charging apparatus or in the region of the standing surface.

Furthermore, it is proposed that the charger interface comprises a plug-in socket or is designed as a plug-in socket.

BRIEF DESCRIPTION OF THE DRAWINGS

Further advantages are evident from the following description of the drawing. The drawings, the description and the disclosure contain numerous features in combination. The person skilled in the art will also consider the features individually in an expedient manner and combine said individual features to form expedient further combinations. Different embodiments are identified by an additional letter.

In the drawings.

DETAILED DESCRIPTION

Figure 1:
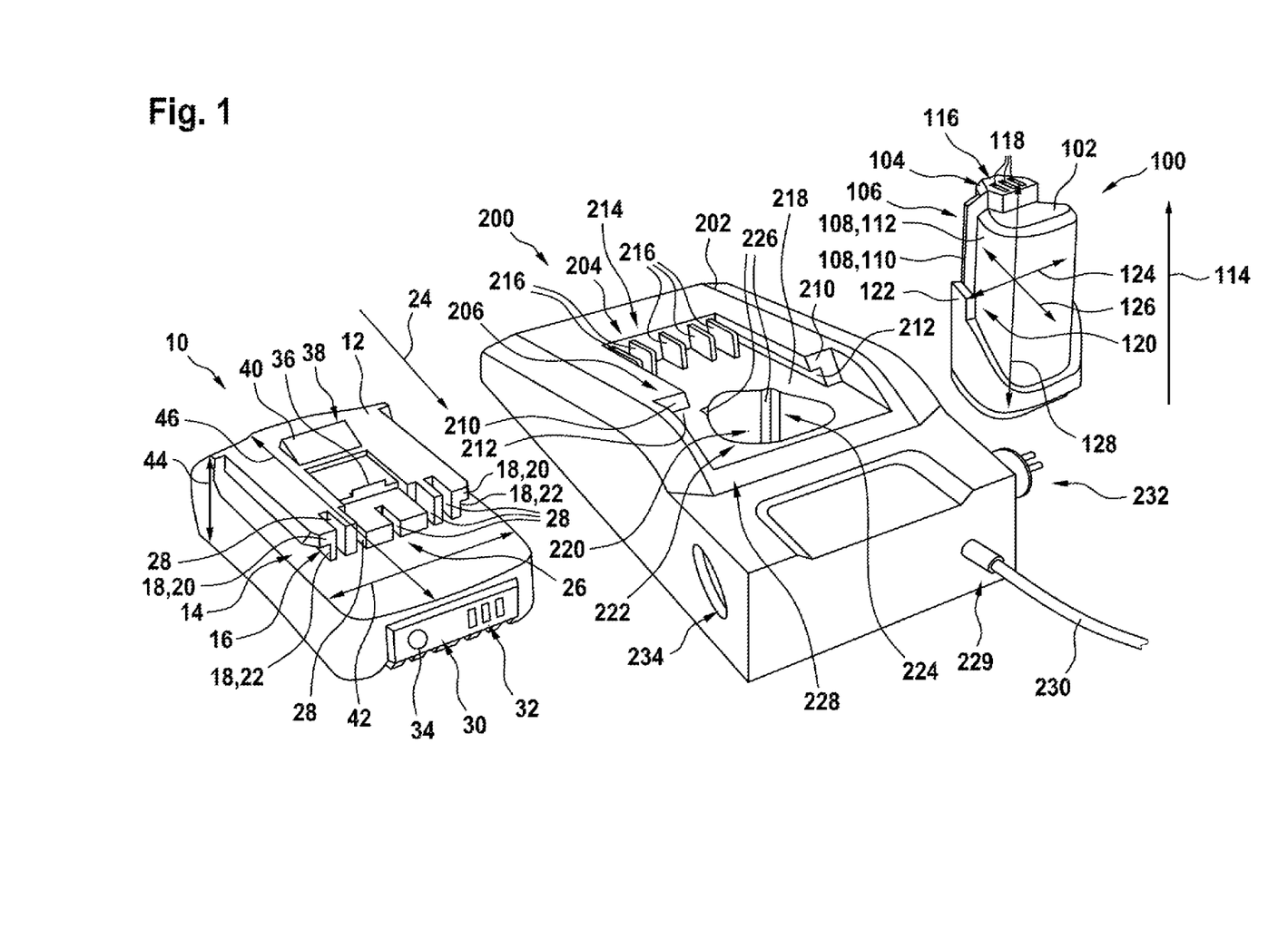
FIG. 1 illustrates a perspective view of a first rechargeable battery pack, a second rechargeable battery pack and a charging apparatus.

FIG. 1 illustrates a first rechargeable battery pack 10, a second rechargeable battery pack 100 and a charging apparatus 200 in a perspective view.

The first rechargeable battery pack 10 has a rechargeable battery pack housing 12 in which by way of example five Li-Ion rechargeable battery cells are arranged connected in series. The rechargeable battery pack 10 is consequently designed as an 18V rechargeable battery pack 10. The rechargeable battery pack housing 12 is produced by way of example from a synthetic material. The five rechargeable battery cells are designed as cylindrical round cells and lie in one layer adjacent to one another. It is conceivable that in order to increase the capacity multiple layers of rechargeable battery cells each having five rechargeable battery cells are arranged one above the other. Alternatively, it would also be conceivable that the rechargeable battery pack have pouch rechargeable battery cells in lieu of the LI-Ion rechargeable battery cells.

The rechargeable battery pack 10 is designed as a replaceable rechargeable battery pack and has a consumer interface 14 that is designed so as to mechanically and electrically connect the rechargeable battery pack 10 to a consumer or to the charging apparatus 200.

The consumer interface 14 has a mechanical interface 16 so as to provide the mechanical connection. The mechanical interface 16 comprises connecting elements 18 that correspond to connecting elements of the consumer and of the charging apparatus 200.

The connecting elements 18 of the first rechargeable battery pack 10 are by way of example designed as a pair of guiding rails 20 that are arranged adjacent to a pair of connecting elements 18 in the form of guiding grooves 22. The guiding rails 20 or the guiding grooves 22 extend along a connection direction 24 of the first rechargeable battery pack 10. The guiding rails 20 are designed by way of example as one piece with the rechargeable battery housing 12. The guiding rails 20 of the first rechargeable battery pack 10 are designed by way of example in a T-shaped manner (when viewed in the cross section).

The consumer interface 14 has in addition an electrical interface 26 so as to provide the electrical connection. The electrical interface 26 comprises by way of example five electrical contact elements (not illustrated). The electrical contact elements are designed by way of example as contact tulips. The electrical contact elements are arranged between the guiding rails 20 in openings 28 of the rechargeable battery pack housing 12. The two outer electrical contact elements are in this case designed as power contacts. The inner electrical contact elements are designed as additional contacts for transmitting information and data.

The rechargeable battery pack 10 has an electronic system (not illustrated) that is arranged in the rechargeable battery pack housing 12 and is designed so as to control the rechargeable battery pack. The electronic system has by way of example a BMS (battery management system) that is designed so as to monitor the battery.

The electronic system is connected by way of example to a state-of-charge display 30 that is embodied so as to display the state of charge of the first rechargeable battery pack 10. The state-of-charge display has a display unit 32 that can be activated via an operating element 34. The operating element 34 is actuated in this case directly by a user pressing on the operating element 34 in the exemplary form of a button.

The mechanical interface 16 has in addition a mechanical coding element 36. The coding element 36 is designed so as to prevent the rechargeable battery pack 10 being connected to a consumer that is not provided. The coding element 36 is designed by way of example as an outwardly-protruding connection piece that extends in a perpendicular manner with respect to the connection direction 24 between the two guiding rails 20.

In addition, the mechanical interface 16 has a locking unit 38 that is provided so as to lock the rechargeable battery pack 10 to the consumer. The locking unit 38 has by way of example a pivotable and spring-loaded locking element 40.

The rechargeable battery pack 10 has a width 42 that is greater than a height 44 of the rechargeable battery pack 10. The width 42 and the height 44 extend by way of example in a perpendicular manner with respect to the connection direction 24 of the rechargeable battery pack 10. A length 46 of the first rechargeable battery pack 10 extends along the connection direction 24. The first rechargeable battery pack 10 has a length 46 that is greater than the width 42 of the rechargeable battery pack 10. The width 42 is by way of example greater than the height 44.

The second rechargeable battery pack 100 has a rechargeable battery pack housing 102 in which by way of example three Li-Ion rechargeable battery cells are arranged connected in series. The rechargeable battery cells are arranged by way of example adjacent to one another in the form of a triangle. The rechargeable battery pack 100 is consequently designed as a 10.8V rechargeable battery pack. The rechargeable battery pack housing 102 is produced by way of example from a synthetic material.

The second rechargeable battery pack 100 is designed as a replaceable rechargeable battery pack and has a consumer interface 104 that is designed so as to mechanically and electrically connect the rechargeable battery pack 100 to a consumer or to the charging apparatus 200. The consumers that are provided for the second rechargeable battery pack 100 require less power than the consumers that are provided for the first rechargeable battery pack 10.

The consumer interface 104 has a mechanical interface 106 so as to provide the mechanical connection. The mechanical interface 106 comprises connecting elements 108 that correspond to connecting elements of the consumer and of the charging apparatus 200.

The connecting elements 108 of the second rechargeable battery pack 100 are designed by way of example as a pair of guiding rails 110. In addition, the rechargeable battery pack housing 102 of the second rechargeable battery pack 100, said rechargeable battery pack housing being adjacent to the guiding rails 110, can also act as a guiding element 112 irrespective of the design of the consumer or of the charging apparatus 200. The guiding rails 110 extend along a connection direction 114 of the second rechargeable battery pack 100. The guiding rails 110 are designed by way of example as one piece with the rechargeable battery housing 102.

The consumer interface 104 has in addition an electrical interface 116 so as to provide the electrical connection. The electrical interface 116 comprises by way of example three electrical contact elements (not illustrated). The electrical contact elements are designed by way of example as contact tulips. The electrical contact elements are arranged between the guiding rails 110 in openings 118 of the rechargeable battery pack housing 102. The two outer electrical contact elements are in this case designed as power contacts. The inner electrical contact element is designed as an additional contact for transmitting information and data.

The second rechargeable battery pack 100 has an electronic system (not illustrated) that is arranged in the rechargeable battery pack housing 102 and is designed so as to control the rechargeable battery pack. The electronic system has by way of example a BMS (battery management system) that is designed so as to monitor the battery.

The second rechargeable battery pack 100 has in addition a locking unit 120 that comprises two spring-loaded latching arms 122 that in the state connected to the consumer engage in corresponding cut-outs.

The second rechargeable battery pack 100 has a width 124 that is somewhat greater than a height 126 of the rechargeable battery pack 10. The width 124 and the height 126 extend by way of example in a perpendicular manner with respect to the connection direction 114 of the second rechargeable battery pack 100. A length 128 of the first rechargeable battery pack 100 extends along the connection direction 114. The second rechargeable battery pack 10 has a length 128 that is greater than the width 124 of the rechargeable battery pack 100. The second rechargeable battery pack 100 has a length 128 that corresponds approx. to the width 42 of the first rechargeable battery pack 10. The width 42 of the first rechargeable battery pack 10 is more than 50% greater than the width 124 of the second rechargeable battery pack 100.

The first rechargeable battery pack 10 is designed as a clip-on rechargeable battery pack, wherein in the state connected to the charging apparatus 200 the rechargeable battery cells of the rechargeable battery pack are not enclosed by the charging apparatus 200. The second rechargeable battery pack 100 is designed as a plug-in rechargeable battery pack, wherein in the state connected to the charging apparatus 200 the rechargeable battery cells of the rechargeable battery pack are enclosed in part or entirely by the charging apparatus 200.

The charging apparatus 200 has a charging housing 202. The charging apparatus 200 has a first rechargeable battery pack interface 204 that is designed so as to mechanically and electrically connect the charging apparatus 200 to the first rechargeable battery pack 10.

The first rechargeable battery interface 204 has a first mechanical interface 206 so as to provide the mechanical connection. The first mechanical interface 206 of the charging apparatus 200 is designed corresponding to the mechanical interface 16 of the first rechargeable battery pack 10 and comprises connecting elements 208 in the form of guiding rails 210 and guiding grooves 212 that can be brought into engagement with the connecting elements 18 of the first rechargeable battery pack 10. In addition, the first rechargeable battery interface 204 has a first electrical interface 214 that is designed so as to provide the electrical connection. The first electrical interface 214 of the charging apparatus 200 is designed corresponding to the electrical interface 26 of the first rechargeable battery pack 10 and has by way of example five electrical contact elements 216.

Between the guiding rails 210, the first rechargeable battery interface 204 has a slide surface 218, on which the first rechargeable battery pack 10 is pushed along the connection direction 24. The slide surface 218 has a rechargeable battery receiving orifice 220 that is allocated to a second rechargeable battery interface 222. The second rechargeable battery pack 100 can be connected to the charging apparatus 200 via the rechargeable battery receiving orifice 220 along the connection direction 114 of the second rechargeable battery pack 100.

The second rechargeable battery interface 222 has a second mechanical interface 224 that corresponds to the mechanical interface 106 of the second rechargeable battery pack 100.

The second mechanical interface 224 is designed to match the outer contour of the second rechargeable battery pack housing 102 and has in addition two longitudinal grooves 226 that correspond to the guiding rails 110 of the second rechargeable battery pack 100.

In addition, the second rechargeable battery interface 222 has a second electrical interface 228 that corresponds to the second rechargeable battery pack 100 and has by way of example three electrical contact elements.

The charging apparatus 200 has an energy source interface 229 via which the charging apparatus can be connected by way of example to an electricity network. The energy source interface 229 has a power cable 230 and a power plug (not illustrated) is arranged at the end of said power cable for connecting to a plug-in socket (not illustrated).

In addition, the charging apparatus 200 has a first charging interface 232 so as to connect to a further charging apparatus 200, and a second charging interface 234 so as to connect to a third charging apparatus 200. It is possible via the first charger interface 232 by way of example to supply the charging apparatus 200 with energy by means of the further charging apparatus. The charging apparatus 200 can supply the third charging apparatus 200 with energy via the second charger interface 234. The second and the third charging apparatus can be designed essentially identical to the first charging apparatus. It is likewise conceivable that the charger interface is designed in such a manner that energy can be both transmitted and also received via the charger interface. It is consequently possible by means of the charger interface to connect the charging apparatus or a further charging apparatus to an energy source such as the power network. The first charger interface 232 and the second charger interface 234 are designed corresponding to one another in such a manner that the first charger interface 232 of the charging apparatus 200 can be connected to a second charger interface 234 of the further charging apparatus 200.

Figure 2:
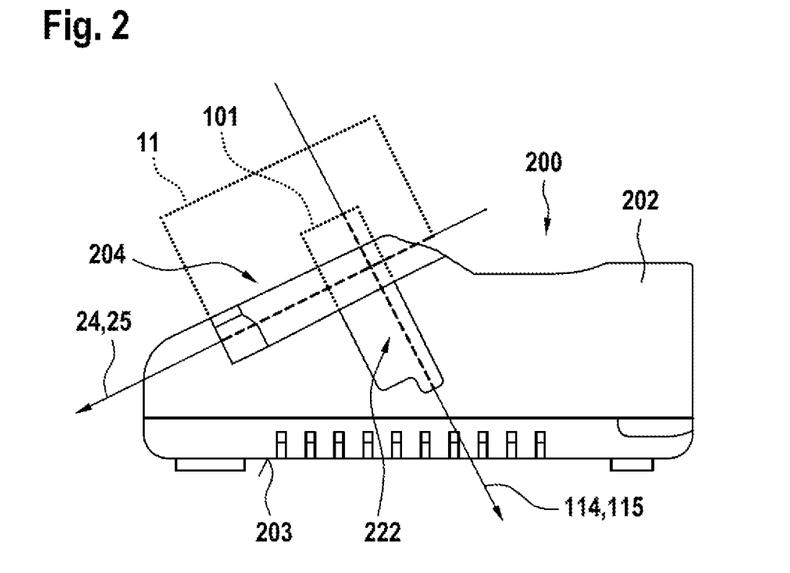
FIG. 2 illustrates a schematic side view of the charging apparatus in accordance with FIG. 1.

The charging apparatus 200 cannot be connected to the first rechargeable battery pack 10 and to the second rechargeable battery pack 100 simultaneously since the first rechargeable battery interface 204 in part overlaps with the second rechargeable battery interface 222, as is illustrated in the side view in accordance with FIG. 2.

FIG. 2 illustrates the charging apparatus 200 in a schematic side view. A first space 11 in which the first rechargeable battery pack 10 is arranged in the state connected to the charging apparatus 200 is indicated by means of the broken line. A second space 101 in which the second rechargeable battery pack 100 is arranged in the state connected to the charging apparatus 200 is indicated likewise by means of the broken line.

So as to connect the first rechargeable battery pack 10 to the first rechargeable battery interface 204 of the charging apparatus 200, the rechargeable battery pack 10 is pushed along the connection direction 24 onto the charging apparatus 200. In addition, the rechargeable battery pack 10 has a connection direction 25 along which the first rechargeable battery pack 10 can be connected to the charging apparatus 200 and which intersects the first battery pack 10 in the connected state. The region in which the connecting apparatus 25 intersects the rechargeable battery pack 10 is identified by way of example by a broken line.

So as to connect the second rechargeable battery pack 100 to the second rechargeable battery interface 222 of the charging apparatus 200, the second rechargeable battery pack 100 is pushed along the connection direction 114 into the charging apparatus 200. In addition, the second rechargeable battery pack 100 has a connection direction 115 along which the second rechargeable battery pack 100 can be connected to the charging apparatus 200 and which intersects the second battery pack 100 in the connected state. The region in which the connecting apparatus 115 intersects the rechargeable battery pack 100 is identified by way of example by a broken line.

The connection direction 25 of the first rechargeable battery pack 10 and the connection direction 115 of the second rechargeable battery pack 100 cross in the region in which the connection directions 25, 115 intersect the respective rechargeable battery pack 10, 100. The angle between the two connection directions is in this case by way of example 90°.

The connection directions 25, 115 that intersect the respective rechargeable battery pack 10, 100 cross by way of example in a region that lies both within the first space 11 of the first rechargeable battery pack 10 and also within the second space 101 of the second rechargeable battery pack 100. Alternatively, it would also be conceivable that the region is only located within one of the spaces 11, 101 or outside the spaces.

The rechargeable battery interfaces 204, 222 are by way of example arranged on the upper side of the charging apparatus 200. The upper side is arranged opposite a standing surface 204 of the charging device 200. Other arrangements of the first rechargeable battery interface 204 or of the second rechargeable battery interface 222 are also conceivable.

Figure 3:
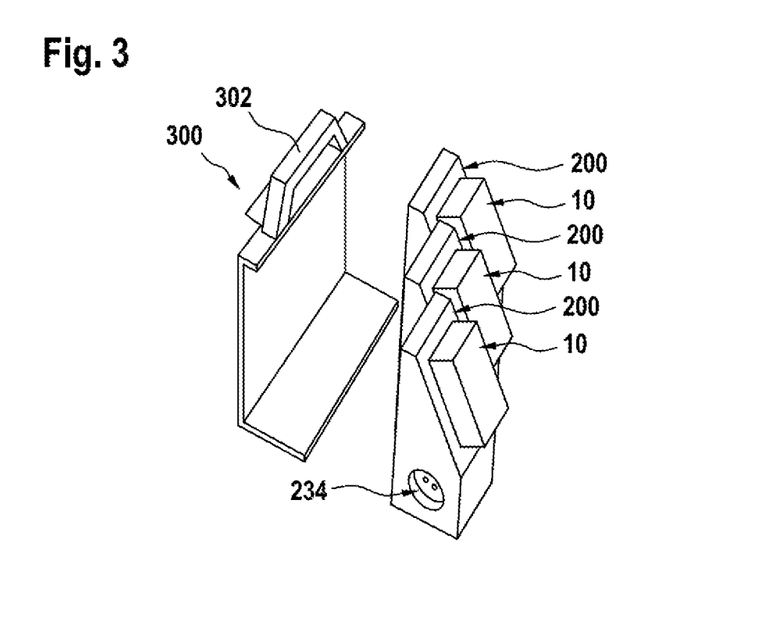
FIG. 3 illustrates a perspective view of three charging apparatuses and a transportation aid.

FIG. 3 illustrates schematically by way of example three charging apparatuses 200 in which is arranged in each case a first rechargeable battery pack 10. The three charging apparatuses 200 are connected to one another via the charger interfaces 232, 234, wherein one of the charging apparatus 200 is connected to the power network via the power cable (not illustrated).

For transportation purposes, the charging apparatuses 200 can be connected to a transportation aid 300 in which the charging apparatus 200 can be connected in a non-positive locking and positive-locking manner alone or in the mutually connected state. The transportation aid 300 has a carrying grip 302.

Figure 4:
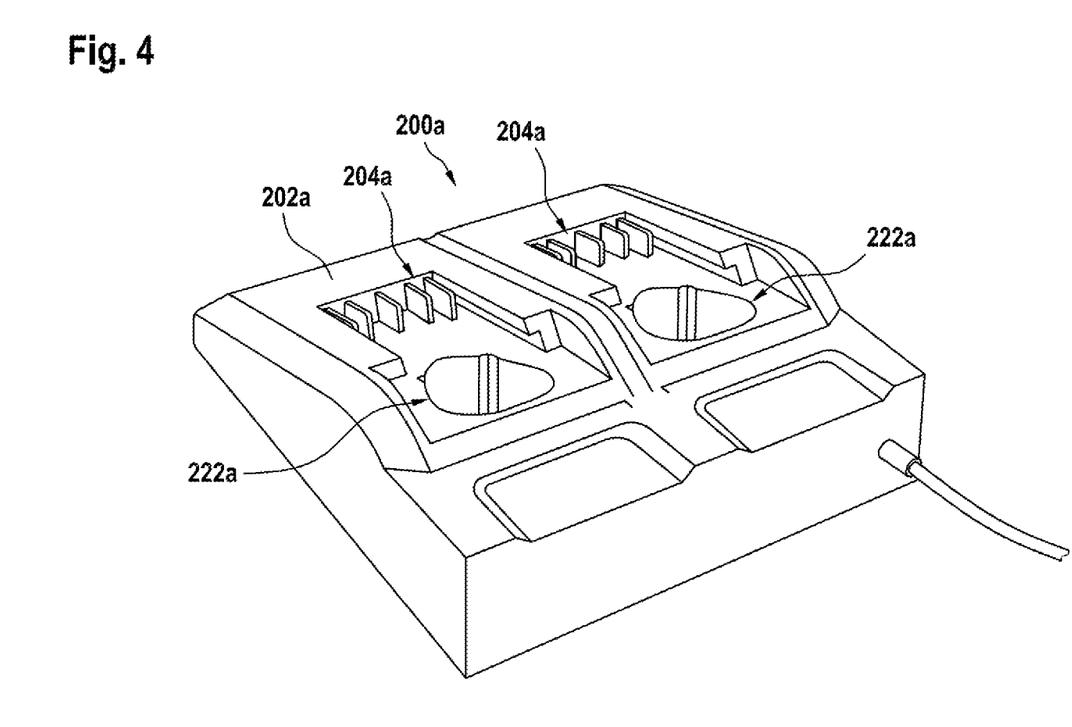
FIG. 4 illustrates a perspective view of a preferred embodiment of the charging apparatus.

FIG. 4 illustrates an alternative embodiment of the charging apparatus 200 in a perspective view.

The charging apparatus 200a differs in this case in particular by virtue of the fact that the charging apparatus 200a has a charging housing 202a having two first rechargeable battery interfaces 204a and two second rechargeable battery interfaces 222a. Advantageously, it is possible as a result to connect two identical or two different rechargeable battery packs simultaneously to the charging apparatus 200a and charge them. The respective rechargeable battery interfaces are arranged by way of example adjacent to one another, however other arrangements are also conceivable, in particular an arrangement one behind the other.

Figure 5:
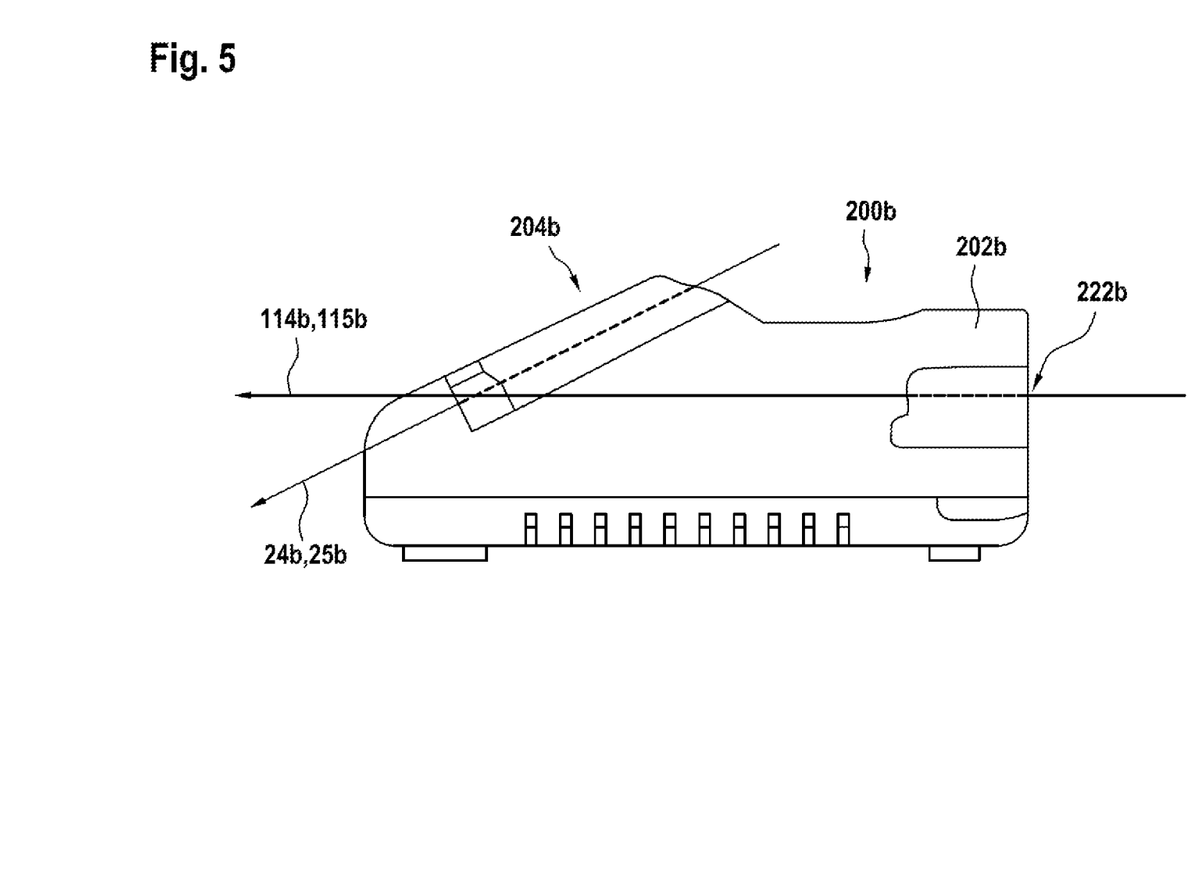
FIG. 5 illustrates a schematic side view of a preferred embodiment of the charging apparatus.

FIG. 5 illustrates a further alternative embodiment of the charging apparatus 200 in a side view.

The charging apparatus 200b has a first rechargeable battery interface 204b for receiving the first rechargeable battery pack 10 along a connection direction 24b and a second rechargeable battery interface 222b for receiving a second rechargeable battery pack 100 along a connection direction 114b.

The first and the second rechargeable battery interface 204b, 222b are arranged spaced from one another in such a manner that the first rechargeable battery pack 10 and the second rechargeable battery pack 100 can be connected simultaneously to the charging apparatus 200b. In particular, the first rechargeable battery pack 10 is designed such that it can be pushed from above and the second rechargeable battery pack 100 is designed such that it can be pushed from behind.

The connection direction 25b that in the connected state intersects the first rechargeable battery pack 10 (region of the connection direction 115b indicated by the broken line), and the connection direction 115b that in the connected state intersects the second rechargeable battery pack 100 (region of the connection direction 25b indicated by the broken line) cross one another. The intersection of the connection directions 25, 115b is located in this case, for example, in the region of first battery interface 204b. The connection directions 25b 115b cross in an angle region between 0° and 45°, for example approx. 30°.

Figure 6:
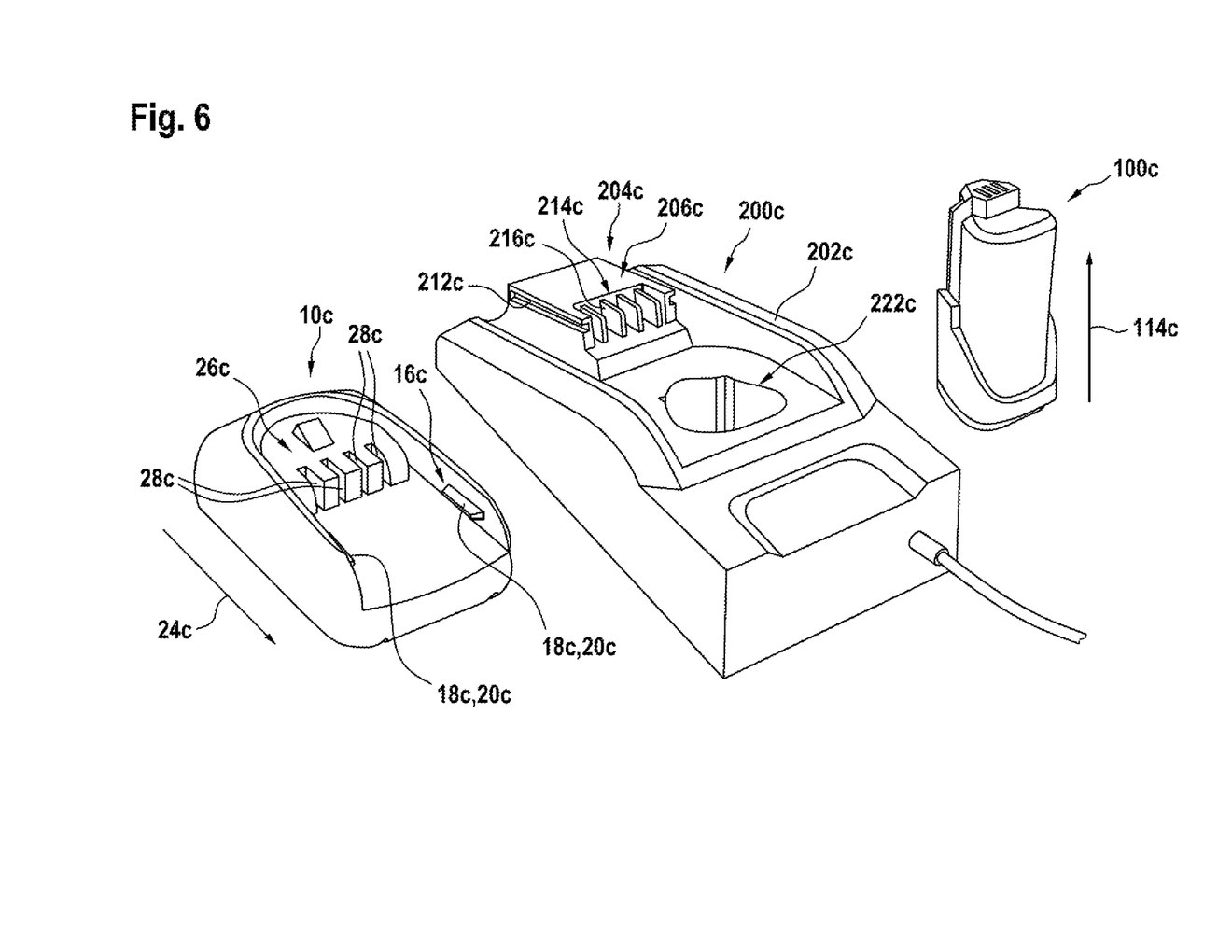
FIG. 6 illustrates a perspective view of an alternative first rechargeable battery pack, the second rechargeable battery pack in accordance with FIG. 1 and a further alternative charging apparatus.

FIG. 6 illustrates a further alternative embodiment of the charging apparatus 200 in accordance with FIG. 1 in a perspective view.

The system illustrated in FIG. 6 has an alternative embodiment of the first rechargeable battery pack 10c. The first rechargeable battery pack 10c has a mechanical interface 16c so as to provide the mechanical connection and said mechanical interface differs from the mechanical interface 16 of the rechargeable battery pack 10 in accordance with FIG. 1.

The mechanical interface 16c has two opposite lying connecting elements 18c in the form of guiding rails 20c that extend along the connection direction 24c of the first rechargeable battery pack 10c. The guiding rails 20c are oriented inwards and consequently when viewed in the cross section are designed in an essentially U-shaped manner.

The electrical interface 26c has four electrical contact elements that are arranged in openings 28c of the rechargeable battery pack housing 12c of the first rechargeable battery pack 10c.

The second rechargeable battery pack 100c is designed essentially identical to the second rechargeable battery pack 100 in accordance with FIG. 1.

The charging apparatus 200c has a first rechargeable battery interface 204c for receiving the first rechargeable battery pack 10c along a connection direction 24c and a second rechargeable battery interface 222c for receiving a second rechargeable battery pack 100c along a connection direction 114c.

The first rechargeable battery interface 204c is designed corresponding to the mechanical and electrical interface 16c, 26c of the first rechargeable battery pack 10c.

The first mechanical interface 206c of the first rechargeable battery interface 204c has two inwardly oriented guiding grooves 212c for receiving the guiding rails 20c of the first rechargeable battery pack 10c. In addition, the first electric interface 214c corresponding to the first rechargeable battery pack 10c comprises four electrical contact elements.

What is claimed is:

1. A charging apparatus for a rechargeable battery pack, comprising:
    a housing;
    a first rechargeable battery interface configured to releasably connect the charging apparatus to a first rechargeable battery pack along a first connection direction; and
    a second rechargeable battery interface configured to releasably connect the charging apparatus to a second rechargeable battery pack along a second connection direction, wherein
    the connection directions intersect the first rechargeable battery pack when the first rechargeable battery pack is releasably connected to the at least one first rechargeable battery interface,
    the connection directions intersect the second rechargeable battery pack when the second rechargeable battery pack is releasably connected to the second rechargeable battery interface,
    the first connection direction and the second connection direction are arranged crossing one another,
    the first rechargeable battery interface has a slide surface that extends along the first connection direction, the slide surface of the first rechargeable battery interface has a rechargeable battery receiving orifice that is allocated to the second rechargeable battery interface, and the sliding surface is configured such that the orifice is completely covered by the first rechargeable battery pack when the first rechargeable battery pack is releasably connected to the at least one first rechargeable battery interface.

2. The charging apparatus according to claim 1, wherein the first and the second rechargeable battery interface cannot be connected simultaneously to two rechargeable battery packs.

3. The charging apparatus according to claim 1, wherein:
    the first rechargeable battery interface has a first electrical interface;

the second rechargeable battery interface has a second electrical interface; and the first electrical interface and the second electrical interface are designed separately from one another.

4. The charging apparatus according to claim 1, wherein a width of the first rechargeable battery interface is greater than a width of the second rechargeable battery interface.

5. The charging apparatus according to claim 4, wherein the width of the first rechargeable battery interface is at least 25% greater than the width of the second rechargeable battery interface.

6. The charging apparatus according to claim 5, wherein the width of the first rechargeable battery interface is at least 50% greater than the width of the second rechargeable battery interface.

7. The charging apparatus according to claim 6, wherein the width of the first rechargeable battery interface is at least 100% greater than the width of the second rechargeable battery interface.

8. The charging apparatus according to claim 1, wherein:
the charging apparatus has at least two first rechargeable battery interfaces; and
the charging apparatus has at least two second rechargeable battery interfaces.

9. The charging apparatus according to claim 1, wherein the charging apparatus has a charger interface that is designed so as to electrically and mechanically connect the charging apparatus to a further charging apparatus.

10. The charging apparatus according to claim 9 wherein the charger interface comprises a plug-in socket or is designed as a plug-in socket.

11. The charging apparatus according to claim 9, wherein the charger interface is arranged adjacent to a standing surface of the charging apparatus.

12. The charging apparatus according claim 9, wherein charger interface is arranged in a region of a standing surface of the charging apparatus.

13. The charging apparatus according claim 1, wherein the sliding surface extends completely about the orifice in one plane.

* * * * *